United States Patent

Matsumoto

[11] Patent Number: 5,967,792
[45] Date of Patent: Oct. 19, 1999

[54] AUTOMATIC PERFORMANCE APPARATUS AND A KARAOKE APPARATUS

[75] Inventor: Shuichi Matsumoto, Hamamatsu, Japan

[73] Assignee: Yamaha Corporation, Hamamatsu, Japan

[21] Appl. No.: 08/816,780

[22] Filed: Mar. 19, 1997

[30] Foreign Application Priority Data

Mar. 21, 1996 [JP] Japan .................................... 8-064431

[51] Int. Cl.⁶ .............................. G09B 5/08; G10H 3/18; G10H 7/00
[52] U.S. Cl. ................................. 434/307 A; 434/307 R; 84/610; 84/726
[58] Field of Search ................................ 434/307 R–309, 434/318, 365; 84/477 R, 601–610, 625, 630, 645, 651, 667, 743, 726; 348/17, 78, 488, 552, 569, 571, 678, 688; 381/51, 63, 81; 386/70, 125; 360/69; 369/53

[56] References Cited

U.S. PATENT DOCUMENTS

| | | | |
|---|---|---|---|
| 5,142,961 | 9/1992 | Paroutaud | 84/726 |
| 5,300,723 | 4/1994 | Ito | 84/610 |
| 5,484,291 | 1/1996 | Nakai et al. | 434/307 A |
| 5,569,869 | 10/1996 | Sone . | |
| 5,574,243 | 11/1996 | Nakai et al. | 84/609 |
| 5,739,457 | 4/1998 | Devecka | 84/743 |
| 5,804,752 | 9/1998 | Sone et al. | 434/307 A X |
| 5,886,275 | 3/1999 | Kato et al. | 434/307 A X |

*Primary Examiner*—Joe H. Cheng
*Attorney, Agent, or Firm*—Pillsbury Madison & Sutro LLP

[57] ABSTRACT

An automatic performance apparatus for conducting a minus-one performance so that a minus part can be automatically changed in accordance with a performance conducted by the user, the apparatus includes a tone generator which synthesizes musical tones of a plurality of parts based on performance data including performance data of the parts, a MIDI input section which externally captures MIDI data including a program change which designates a tone color related to a part, a selected part judging section which specifies the part corresponding to the MIDI data based on the program change, a mute control section which eliminates performance data of the part specified by the selected part judging section from the performance data, and a performance converting section which inserts the MIDI data into the part from which the performance data are eliminated are disposed.

7 Claims, 3 Drawing Sheets

AUTOMATIC PERFORMANCE APPARATUS AND A KARAOKE APPARATUS

BACKGROUND OF THE INVENTION

FIELD OF THE INVENTION

This invention relates to an automatic performance apparatus and a karaoke apparatus which conduct a so-called minus-one performance.

BACKGROUND

As well known, various types of karaoke apparatuses which offer an accompaniment performance to a singer have been developed. When such karaoke apparatuses are used, a karaoke music piece is usually utilized in the form of an accompaniment performance for a song. In some cases, the user wants to play an instrument accompanied with the karaoke performance. For example, an assembly such as a song recreation will be considered. When someone sings a song accompanied with music, there often occurs a case where a person who has an instrument such as a tambourine takes part in the performance accompanying to the song for the purpose of a good atmosphere. In the case where such an action of playing an instrument is conducted during the karaoke performance, if the karaoke apparatus can function as a so-called accompanying minus-one performance apparatus which plays parts other than the part for which the instrument is played, the way of karaoke enjoinment is further increased.

It is known that a conventional automatic performance apparatus, for example, a sequencer has a function of such an accompanying minus-one performance.

In a conventional automatic performance apparatus having the function of a minus-one performance, the user must indicate by a manual operation a part that the user want to eliminate from a karaoke performance (hereinafter, such a part is referred to as "minus part"). Accordingly, when the minus part is desired to be changed from a rhythm part to a base part, and from the base part to a guitar part in the progress of a music piece, for example, it is necessary to perform an operation of changing the minus part for every change. This produces a problem in that the operation is extremely troublesome and a load on the user is heavy.

SUMMARY OF THE INVENTION

The invention has been conducted in view of the above-mentioned background. It is an object of the invention to provide an automatic performance apparatus and a karaoke apparatus which, when a minus-one performance is to be conducted, can automatically change a minus part in accordance with a performance conducted by the user.

In order to solve the above-discussed problem, an automatic performance apparatus according to the present invention includes:

a musical-tone synthesizing device for synthesizing musical tones of a plurality of parts based on first performance data including performance data of the parts;

a data capturing device for externally capturing second performance data including identification information related to a part;

a part specifying device for specifying the part corresponding to the second performance data captured by the data capturing device, based on the identification information; and a muting device for removing performance data of the part specified by the part specifying device from the first performance data, and then outputting the first performance data to the musical-tone synthesizing device.

The automatic performance apparatus according to the present invention, further includes:

a performance monitoring device for scanning the first performance data and judging whether each part is being played or not; and a mute releasing device for, when the second performance data is not supplied to the data capturing device for a predetermined or longer time period during a period when the performance monitoring device judges that the part specified by the part specifying device is being played, releasing the muting device.

The automatic performance apparatus according to the present invention, further includes a merging device for inserting the second performance data into the part of which the performance data is eliminated by the muting device.

The automatic performance apparatus comprises a karaoke apparatus, the karaoke apparatus includes a mixing device for mixing musical tones synthesized by the musical-tone synthesizing device with a voice input through a microphone, and outputting the mixed musical tones and voice.

DETAILED DESCRIPTION OF THE PREFERRED EMBODIMENTS

Hereinafter embodiments of the invention will be described with reference to the accompanying drawings. The following description is directed to the embodiments in which the invention is applied to a karaoke apparatus. However, the application of the invention is not limited to a karaoke apparatus and may be applied also to various types of automatic performance apparatuses.

A: Configuration of an Embodiment (1) Whole Configuration

Figure 1:
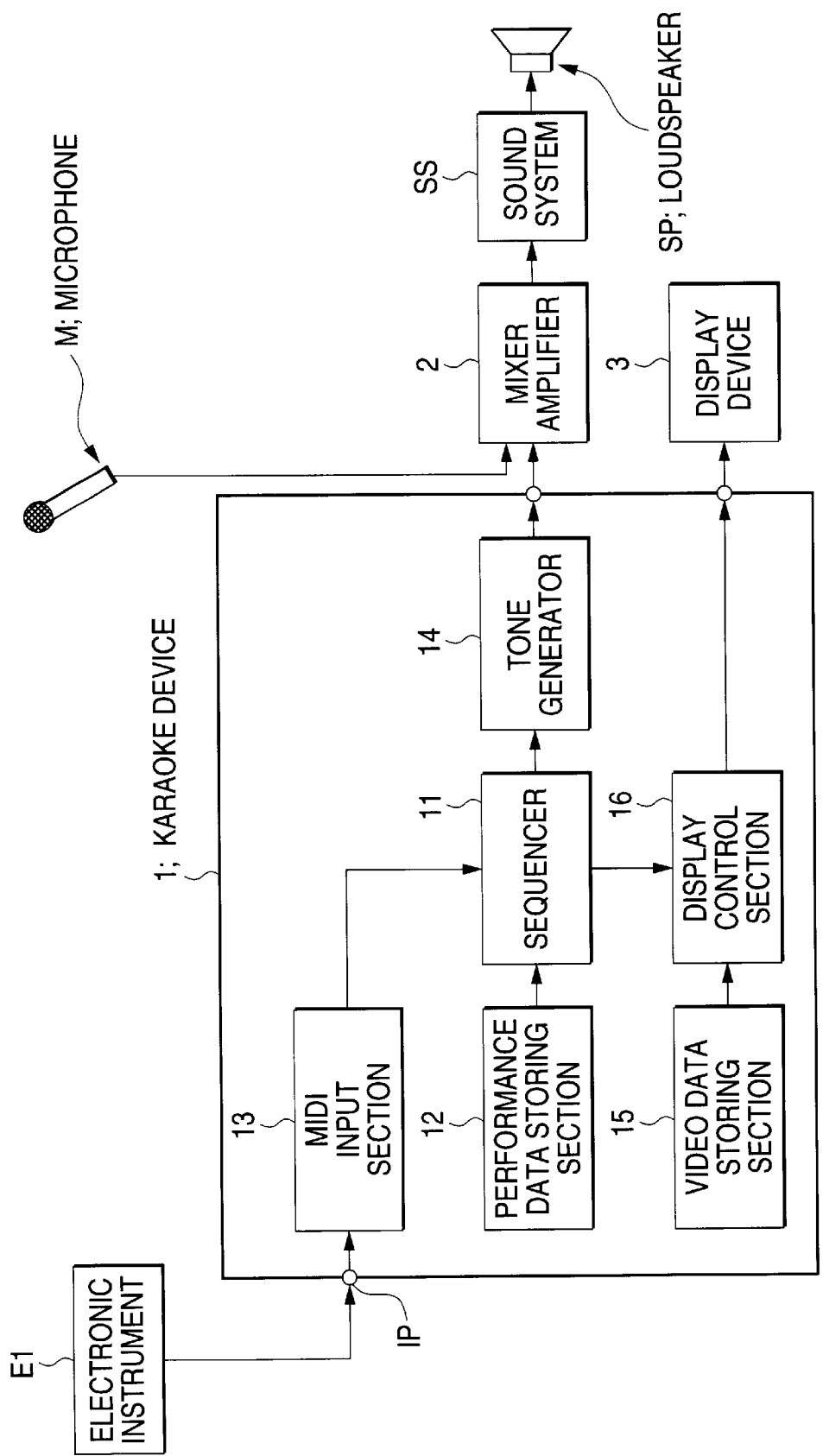
FIG. 1 is a block diagram showing the whole configuration of an embodiment of the invention.

FIG. 1 is a block diagram showing the whole configuration of the karaoke apparatus of an embodiment of the invention. In FIG. 1, 1 designates a karaoke device which synthesizes musical tones based on performance data of a karaoke music piece and reproduces background image data of the karaoke music piece. The karaoke device 1 mainly includes a sequencer 11, a performance data storing section 12, a MIDI input section 13, a tone generator 14, a video data storing section 15, and a display control section 16.

The sequencer 11 includes: a CPU which controls various portions of the karaoke device 1; a ROM which stores various kinds of control programs (to be executed by the CPU) for realizing functions of the sequencer, and font data; and a RAM which is used as a work area for the CPU. The sequencer 11 controls the reproduction of performance data and video data, and also a so-called minus-one performance. The minus-one performance will be described later in detail.

The performance data storing section 12 includes a storage device which is configured by a hard disk or the like and stores performance data of a number of karaoke music pieces recorded in a format of MIDI (Musical Instrument Digital Interface).

Figure 2:
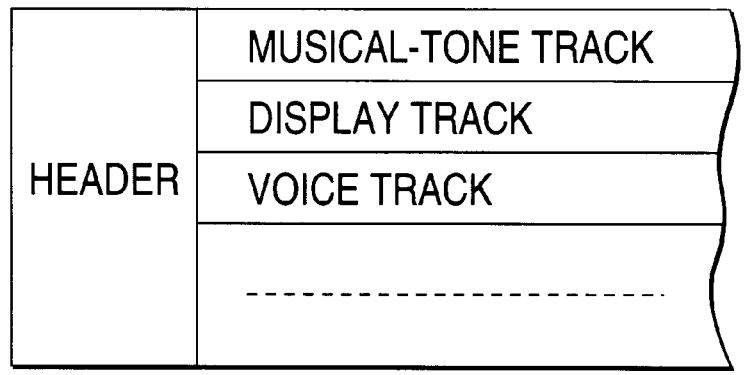
FIG. 2 is a diagram showing a format of a performance data in the embodiment.

As shown in FIG. 2, a performance data of one music piece includes a header and a plurality of tracks such as a musical-tone track, a display track, and a voice track. The header is a portion in which various kinds of data related to the music piece are written. More specifically, data of the title of the music piece, the genre, the play time of the music piece, and the like are recorded, and also a part table which will be described later is recorded.

Figure 3:
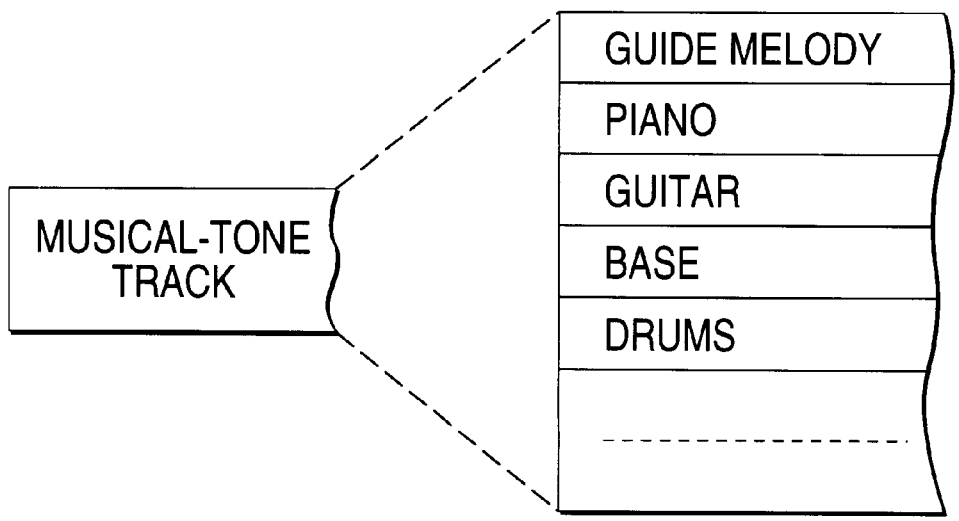
FIG. 3 is a diagram showing a format of a musical-tone track in the performance data.

As shown in FIG. 3, the musical-tone track has a plurality of tracks in which music-piece data of each part are stored. In each of the tracks, sequential data corresponding to one of tone colors such as a guide melody, a piano, a guitar, a base, and drums are stored. In the embodiment, parts have a one-to-one relationship with tone colors. The sequential data are used for controlling the musical-tone synthesization of the tone generator 14, and include a note data related to the control of the tone generation, and various kinds of control data. In addition, information indicating which tone colors are assigned to the parts of the musical-tone track is recorded in the part table of the header.

In the display track, code information which is required for displaying lyrics is recorded. In the voice track, a data for applying an accompaniment of voices such as a back chorus is stored.

The MIDI input section 13 shown in FIG. 1 captures MIDI data supplied from an electronic instrument EI connected to a MIDI input terminal IP and supplies the MIDI data to the sequencer 11. The electronic instrument EI is an electronic keyboard, or the like, and outputs MIDI data corresponding to a playing operation. Similarly to the performance data, the MIDI data are sequential data for one track and including a note data and various kinds of control data. The control data include a control change data indicating a tone color.

The tone generator 14 includes a plurality of tone generating channels, allocates the tone generating channels to performance data of respective parts supplied from the sequencer 11, and synthesizes musical-tone signals corresponding to the performance data captured from the respective channels. The generated musical-tone signals are supplied to a mixer amplifier 2.

The video data storing section 15 is a storage device such as a laser disk, or a video CD, and stores plural units of video data of background images corresponding to genres of karaoke music pieces. Video data corresponding to a genre designated by the header of the performance data are read out from the video data storing section 15, and then reproduced.

The display control section 16 superimposes a font data (an image data of characters corresponding to codes of lyrics) output from the sequencer 11, on the video data read out from the video data storing section 15, and outputs the synthesized image.

The reference numeral 2 designates the mixer amplifier. The mixer amplifier 2 mixes the musical-tone signals supplied from the karaoke device 1 with voice signals supplied from a microphone M, amplifies the mixed signals, and then outputs the signals. The output of the mixer amplifier 2 is supplied to a sound system SS, and output as sounds through a loudspeaker SP.

The reference numeral 3 designates a display device. The display device 3 displays a background image and the lyrics of the karaoke music piece which correspond to the video signal supplied from the karaoke device 1.

(2) Configuration of Main Portions

Figure 4:
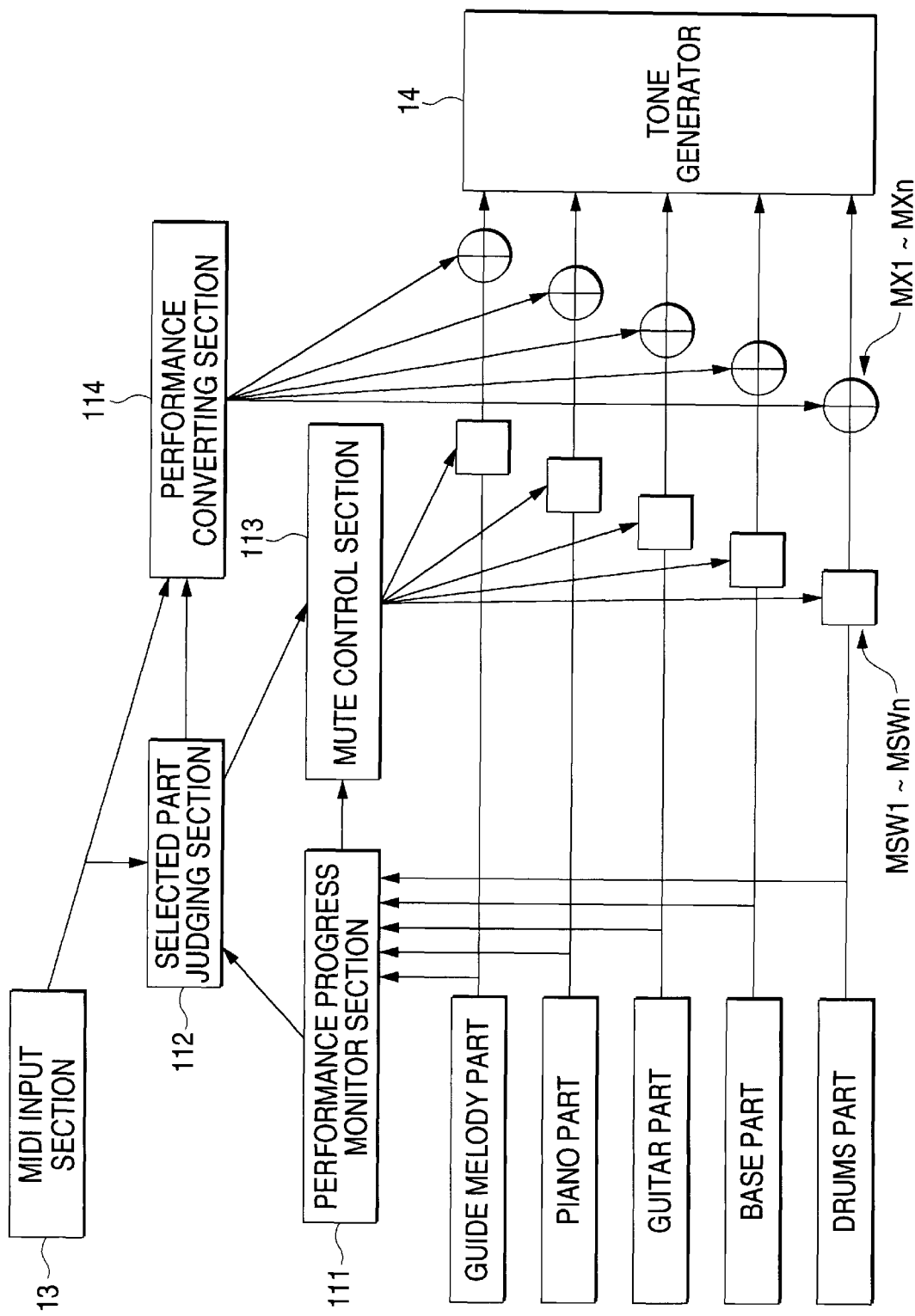
FIG. 4 is a block diagram showing the configuration of the main portions of the embodiment of the invention.

Next, the configuration of the main portions of the embodiment of the invention will be described. FIG. 4 is a block diagram showing the configuration of the main portions (including the sequencer 11) of the embodiment which can conduct the minus-one performance. Referring to FIG. 4, performance data of the musical-tone tracks read out from the performance data storing section 12 are input to the sequencer 11 in units of parts. At the start of the performance, a performance progress monitor section 111 reads out the part table from the header of the performance data and holds the information of the table. During the performance, the performance progress monitor section scans transmission channels corresponding to the respective parts, and checks the occurrence of the data supply of the channels to judge whether each part is being played or not. The judgment result is supplied to a selected part judging section 112 and also to a mute control section 113.

On the other hand, the MIDI data captured from the MIDI input section 13 are supplied to the selected part judging section 112 and a performance converting section 114. The selected part judging section 112 detects the tone color designated in a program change of the MIDI data, and refers to the part table held in the performance progress monitor section 111 by using the tone color as a key. Accordingly, a part corresponding to the tone color designated by the electronic instrument EI is specified, and the part is designated in the mute control section 113 and the performance converting section 114.

The mute control section 113 enables a mute switch MSW in the transmission channel for the part designated by the selected part judging section 112, so as to delete the performance data of the part. Usually, mute switches MSW1 to MSWn for the parts are disabled.

The data to be deleted may be all of the performance data including various kinds of control data such as a pitch bend. Alternatively, for example, only some of the performance data such as note data for designating note-on, note-off, and a note-number may be deleted.

The selected part judging section 112 includes a timer which is not shown. During a time period which is judged to be played the designated part, when the data supply from the MIDI input section 13 is stopped, the time period of this stop is measured by the selected part judging section 112. If no data is supplied from the MIDI input section 13 for a predetermined or longer time period even though the designated part is played, the selected part judging section 112 judges that the performance by the electronic instrument EI is stopped, and cancels the designation of the part to the mute control section 113 and the performance converting section 114. In response to this, the mute control section 113 cancels the mute of the part.

On the other hand, if the designated part is not played, and another part is played, it is natural that the performance by the electronic instrument EI is not conducted. In such a case, the mute is not canceled.

The performance converting section 114 inserts the MIDI data supplied from the MIDI input section 13 into the transmission channel (see FIG. 4, MX1 to MXn) for the part designated by the selected part judging section 112. In the case where all of the performance data are muted, the performance converting section 114 inserts all of the MIDI data into the transmission channel for the designated part. In the case where only some of performance data such as note data are muted, only the data corresponding to the muted data are inserted (i.e., merged) between the performance data in the transmission channel.

B: Operation of the Embodiment

Next, the operation of the embodiment having the above-described configuration in each of the following cases will be separately described. That is, the cases where (1) the user uses the electronic instrument EI so as to take part in the performance, (2) the user changes the tone color of the electronic instrument EI, and (3) the user stops playing the electronic instrument EI will be described.

(1) Operation when the User Takes Part in the Performance

When the user takes part in the performance by using the electronic instrument EI during the karaoke performance, MIDI data corresponding to the playing operation are output from the electronic instrument EI. The MIDI data are captured into the karaoke device 1 via the MIDI input section 13, and the selected part judging section 112 detects the tone color designated in the program change. By using the tone color as a key, a part corresponding to the tone color designated by the electronic instrument EI is specified by the performance progress monitor section 111. The performance data of the specified part are muted by the mute control section 113. Further, the performance converting section 114 merges the MIDI data into the muted part. Thus, the part of the karaoke which the user takes in the performance is automatically muted. Instead of the muted part, the musical tone of the electronic instrument EI is added to the accompanying performance, and output through the loudspeaker SP together with the voice input from the microphone M.

(2) Operation when the User Stops the Performance

After the user takes part in the performance as described above, if the user stops the performance, no data is input to the MIDI input section 13. When the supply of the MIDI data from the electronic instrument EI is stopped even though the designated part is played, the selected part judging section 112 measures an elapse time after the supply of the data is stopped. When a predetermined time period elapses, the selected part judging section 112 judges that the performance conducted by the user is stopped. In this case, the designation of the part in the mute control section 113 and the performance converting section 114 is canceled, and the mute of the part is canceled. In this way, when the user quits the performance while the user's part should be played, the mute is canceled, and the part is automatically switched to the performance based on the internal performance data.

On the other hand, it is natural that the user stops the performance in the case where the part of the user should not be played. In this case, even when the supply of data from the electronic instrument EI is stopped, the mute of the designated part is not canceled.

(3) Operation when the Tone Color is Chanced

In the case where an electronic instrument EI which can generate various kinds of tone colors such as an electronic keyboard is connected to the device, when the user changes the tone color during the performance, the selected part judging section 112 detects the change of the tone color from the program change of the MIDI data. The selected part judging section 112 designates the part corresponding to the tone color after the change, in the mute control section 113 and the performance converting section 114. Accordingly, the mute of the part which has been designated is canceled, and the part corresponding to the tone color after the change is next muted. Instead of the muted part, the musical tones played by the user are added. In this way, in accordance with the change of the tone color during the performance, the muted part is automatically switched.

The present invention is not limited to the above-described embodiment, and can be, for example, modified as follows.

(1) Unlike the above-described embodiment in which the MIDI data output from an externally connected instrument are merged into the muted part, the karaoke device 1 conducts only the mute of the corresponding part. As for the output of the externally connected instrument, the tone may be generated from a tone generator outside the karaoke device 1.

(2) When an instrument which does not output a program change such as an automatic piano is connected to the karaoke device 1, the type of the connected instrument is inquired from the karaoke device 1 via communication. In this way, the karaoke device 1 checks the model type so that the corresponding part may be specified.

(3) The format of the performance data (including the output of the externally connected instrument) is not limited to MIDI, and may have another data format. In the above-described embodiment, the part is specified by using the tone color designated in the program change of MIDI. Alternatively, other information may be used as far it can identify the part.

(4) The invention may be configured as a communication karaoke system which distributes performance data via communication lines.

As described above, according to the invention, when a minus-one performance is to be conducted in an automatic performance apparatus or a karaoke apparatus, the minus part can be automatically selected or changed, or the minus-one performance can be automatically canceled in accordance with the performance conducted by the user.

What is claimed is:

1. An automatic performance apparatus, comprising:

musical-tone synthesizing means for synthesizing musical tones of a plurality of parts based on first performance data including performance data of the parts;

data capturing means for externally capturing second performance data including identification information related to a part;

part specifying means for specifying the part corresponding to the second performance data captured by said data capturing means, based on the identification information; and muting means for eliminating performance data of the part specified by said part specifying means from the first performance data, and outputting the first performance data to said musical-tone synthesizing means.

2. The automatic performance apparatus of claim 1, further comprising:

performance monitoring means for scanning the first performance data, and judging whether each part is played or not; and mute releasing means for releasing said muting means when the second performance data is not supplied to said data capturing means for a predetermined time period during a period when said performance monitoring means judges that the part specified by said part specifying means is played.

3. The automatic performance apparatus of claim 2, further comprising merging means for inserting the second performance data into the part of which the performance data is eliminated by said muting means.

4. The automatic performance apparatus of claim 1, further comprising merging means for inserting the second performance data into the part of which the performance data is eliminated by said muting means.

5. The automatic performance apparatus of claim 1, further comprising mixing means for mixing musical tones synthesized by said musical-tone synthesizing means with a voice input through a microphone, and outputting the mixed the musical tones and the voice.

6. The automatic performance apparatus of claim 1, wherein said automatic performance apparatus includes a karaoke apparatus.

7. The automatic performance apparatus of claim 6, further comprising mixing means for mixing musical tones synthesized by said musical-tone synthesizing means with a voice input through a microphone, and outputting the mixed the musical tones and the voice.

* * * * *